A. Stoler and S. A. Sisson.
Harvester Rake.
№ 41,793. Patented Mar. 1, 1864.
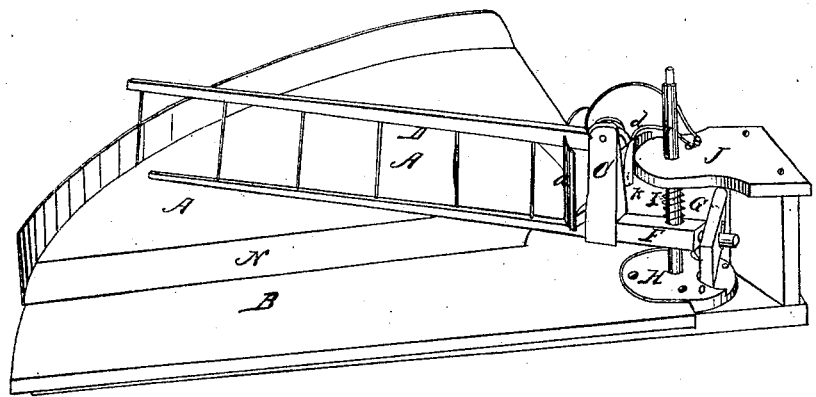
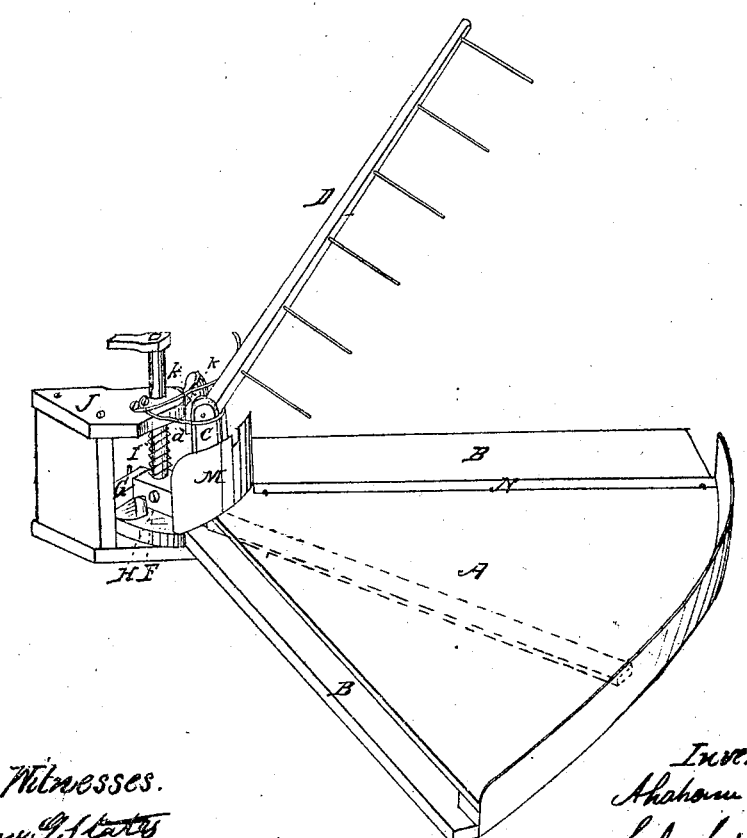
Witnesses.
Evan J. Statts
Louis M. Whayton
Inventors.
Abraham Stoler
S. A. Sisson

UNITED STATES PATENT OFFICE.

ABRAHAM STOLER AND SAMUEL A. SISSON, OF BRISTOL, PENNSYLVANIA.

IMPROVEMENT IN RAKING ATTACHMENTS TO HARVESTERS.

Specification forming part of Letters Patent No. 41,793, dated March 1, 1864.

*To all whom it may concern:*

Be it known that we, ABRAHAM STOLER and SAMUEL A. SISSON, both of Bristol, in the county of Bucks and State of Pennsylvania, have invented a new and Improved Attachment for Removing Grain from a Harvesting-Machine; and we do hereby declare that the following is a full and exact description thereof, reference being had to the accompanying drawings and letters of reference marked thereon, of which—

Figure 1 is a front view, and shows the rakes near the front of the platform, where they receive the gavel. Fig. 2 is a rear view, and shows the rakes near the rear of the platform and in the position they are after delivering the gavel.

The following is a description of the different parts and their workings, the letters of reference being the same on each of the drawings: the two parts A and B of the double platform, the apron N, the upright C, the rake D, the rake-head E, the operating-arm F, the button G, the circular plate H, the shaft I, the plate J, the irregularly-curved guide K, the bent arm L, the shield M.

The lower and main part, B, of the platform extends a few inches beyond A, the upper one, both front and rear, B being the part which is attached to the finger-bar of the harvester. A is placed a sufficient distance above B to allow a free passage of rake E between the two. One side of apron N is hinged to A and the other rests on B. By this arrangement the grain and grass are kept from collecting between the two parts, and thus obstructing the passage. Still the rake E is allowed to pass from underneath A. The rake D is hinged to the upright C of arm F. The rake E is bolted to arm F, which is attached to shaft I, and is therefore moved by it. The shaft I has in addition to its oscillating movement an up-and-down motion, being elevated by the action of button G, and falling of its own weight after the button has passed its center of motion and ceased to render support. The rakes are moved over the platform from front to rear. On arriving there the rake D leaves guide K, and rake E leaves platform A, when both rakes, together with their attachments, having no further support, drop of their own weight, which brings rake E to platform B. Rake D, in falling, is interrupted by the crooked arm L, which throws it in an upright position, as seen in Fig. 2. The rakes now begin to move forward, the rake E passing between the two platforms, and the rake D is kept in an upright position by guide K. By the time the rakes have reached the front of the platform a sufficient quantity of grain has gathered for a gavel, and the rake E, passing from underneath platform A, takes the under side of said gavel, and rake D, having now passed the guide, falls with its full weight upon the gavel. The two rakes now commence their backward movement, carrying with them the gavel. As this commences, the end of the button G catches against stop O of plate H, which causes the button to up-end, and in so doing the rakes are bodily raised (still retaining horizontal position) sufficient to allow rake E to pass over platform A. Rake D now rests on guide K, and is thereby kept to its place, and the gavel so clasped as to prevent scattering of the grain. As the rakes reach the rear end of the platform rake D passes from guide K, and rake E from platform A. There being no further support to the rakes, they drop. Rake D, being intercepted by L, is suddenly uplifted, and the gavel is deposited in perfect order at the rear of machine, and sufficiently at one side to be entirely out of the way of the team on succeeding round.

We find the two rakes, operated as described, are of decided advantage in heavy and lodged grain, as one rake will not in all cases insure perfect work; but in light grain one rake will do good execution. The rake E, being bolted to arm F, may be removed, leaving the rake D, which will still operate as described and perform the work well; or by removing the rake D and leaving rake E, which may be provided with teeth, and the same movement retained and good work done, the rake E being underneath the grain and lifting instead of bearing down, the labor is performed easier and with more certainty.

What we claim as our invention, and wish to secure by Letters Patent, is—

1. The automatic attachments, as described, consisting of plate H, button G, arm F, upright C, rakes D and E, guide K, and bent arm L, or their equivalents, in combination with the shaft I, when arranged substantially as and for the purposes set forth.

2. Giving the rake-shaft I its elevating motion by means of button G and arm F, substantially as described.

3. The double platform A and B, in combination with the two rakes D and E, when so operated that rake E passes over and under platform A, and the rake D is kept in an upright position while on its forward stroke, and in a horizontal position while on back-stroke.

4. Rake E, when operated in the manner described, by means of shaft I and button G, or their equivalents, in combination with the double platform.

ABRAHAM STOLER.
S. A. SISSON.

Witnesses:
EVAN G. STATES,
LEWIS M. WHARTON.